US007306455B2

(12) United States Patent
Dewar et al.

(10) Patent No.: US 7,306,455 B2
(45) Date of Patent: Dec. 11, 2007

(54) MULTI-POSITION VALVE PIN FOR AN INJECTION MOLDING APPARATUS

(75) Inventors: Neil Dewar, Georgetown (CA); Denis Babin, Georgetown (CA)

(73) Assignee: Mold-Masters Limited, Georgetown, Ontario (CA)

( * ) Notice: Subject to any disclaimer, the term of this patent is extended or adjusted under 35 U.S.C. 154(b) by 645 days.

(21) Appl. No.: 10/811,176

(22) Filed: Mar. 26, 2004

(65) Prior Publication Data
US 2005/0046083 A1 Mar. 3, 2005

Related U.S. Application Data

(63) Continuation-in-part of application No. 10/651,547, filed on Aug. 29, 2003, now Pat. No. 7,168,943.

(51) Int. Cl.
B29C 45/23 (2006.01)

(52) U.S. Cl. ...................... 425/564; 425/566

(58) Field of Classification Search ............... 425/562, 425/563, 564, 565, 566
See application file for complete search history.

(56) References Cited

U.S. PATENT DOCUMENTS

| 2,865,050 | A | 12/1958 | Strauss |
| 3,777,990 | A | 12/1973 | Herzog |
| 3,807,914 | A | 4/1974 | Paulson et al. |
| 4,013,393 | A | 3/1977 | Gellert |
| 4,013,518 | A | 3/1977 | Gellert |
| 4,026,518 | A | 5/1977 | Gellert |
| 4,212,626 | A | 7/1980 | Gellert |
| 4,285,661 | A | 8/1981 | Yotsuisuji et al. ........ 425/563 |
| 4,521,179 | A | 6/1985 | Gellert |
| 4,530,654 | A | 7/1985 | Rose |
| 4,781,572 | A | 11/1988 | Boring ...................... 425/564 |
| 4,789,318 | A | 12/1988 | Ehritt |
| 4,938,681 | A | 7/1990 | Gellert |

(Continued)

FOREIGN PATENT DOCUMENTS

DE 43 11 196 A1 10/1994

(Continued)

Primary Examiner—Tim Heitbrink
(74) Attorney, Agent, or Firm—Medler Ferro PLLC

(57) ABSTRACT

An injection molding apparatus that includes a nozzle having a nozzle channel, a mold cavity in communication with the nozzle channel of the nozzle for receiving a melt stream of moldable material from the nozzle channel through a mold gate; and a valve pin that is axially movable through the nozzle channel of the nozzle between a first retracted position in which the valve pin closes the mold gate to block melt flow between the nozzle channel and the mold cavity, an extended position in which an end portion of the valve pin extends through the mold gate and into the mold cavity, and a third retracted position in which the end portion of the nozzle pin is withdrawn from the mold cavity into the nozzle and spaced apart from the mold gate thereby opening the mold gate. The end portion of the valve pin defines a melt flow path on an outer surface thereof that extends through the mold gate when the valve pin is in the extended position for transmitting the melt stream from the nozzle channel to the mold cavity when the valve pin is in the extended position.

11 Claims, 13 Drawing Sheets

U.S. PATENT DOCUMENTS

| | | |
|---|---|---|
| 5,125,817 A | 6/1992 | Yamachika |
| 5,238,378 A | 8/1993 | Gellert ................. 425/130 |
| 5,423,672 A | 6/1995 | Gordon |
| 5,556,582 A | 9/1996 | Kazmer |
| 5,695,793 A | 12/1997 | Bauer |
| 5,851,571 A | 12/1998 | Manner |
| 6,270,711 B1 | 8/2001 | Gellert et al. |
| 6,287,107 B1 | 9/2001 | Kazmer et al. |
| 6,830,447 B2 | 12/2004 | Babin |
| 7,175,420 B2 * | 2/2007 | Babin et al. ................. 425/564 |
| 2002/0028266 A1 | 3/2002 | Babin |
| 2002/0050664 A1 | 5/2002 | Moore, Jr. et al. |
| 2002/0086074 A1 | 7/2002 | Lavallee |
| 2002/0110617 A1 | 8/2002 | Lee |
| 2004/0217499 A1 | 11/2004 | Manigatter et al. |

FOREIGN PATENT DOCUMENTS

| | | |
|---|---|---|
| DE | 102 07 065 A1 | 8/2003 |
| EP | 0 739 702 A1 | 10/1996 |
| EP | 0 891 851 A1 | 1/1999 |
| JP | 55-61438 | 5/1980 |
| JP | 55061438 | 5/1980 |
| JP | 07290518 A | 11/1995 |

* cited by examiner

MULTI-POSITION VALVE PIN FOR AN INJECTION MOLDING APPARATUS

This application is a continuation-in-part of and claims priority to U.S. patent application Ser. No. 10/651,547 filed Aug. 29, 2003 now U.S. Pat. No. 7,168,943.

FIELD OF THE INVENTION

The present invention relates generally to an injection molding apparatus and, in particular, to a hot runner nozzle gated by a valve pin.

BACKGROUND OF THE INVENTION

In an injection molding apparatus having a plurality of valve-pin gated hot runner nozzles for injecting melt into a plurality of mold cavities, proper alignment between the moving components is desired in order to maximize the lifetime of the components and produce high quality molded parts.

Typically, prior art valve-gated nozzles include reciprocating valve pins, which retract to open the mold gates and extend to close the mold gates. In this type of arrangement, the valve pin is typically un-guided during the entirety of the opening and closing phases of the injection cycle.

Several known valve-gated nozzles include continuously guided valve pins, which reduce wear on the valve pin and mold gate. These nozzles are typically limited to molding articles having a hole, such as a compact disc, for example. U.S. Pat. No. 5,423,672 to Gordon discloses a valve-gated nozzle for molding products having a hole.

In some valve gated nozzle systems, it is common for a blush mark to appear on the molded part, opposite the gate. The blush mark occurs as a result of the flow patterns in the melt, when the melt enters the mold cavity at such a high pressure in a concentrated stream it hits the cold back wall forming flow lines that appear on the part as what is commonly termed a blush mark. This may be unacceptable in molded parts that have an aesthetic requirement,especially with high gloss, show surfaces, and with surfaces that are painted, chrome plated or similarly processed after molding.

Thus, a valve pin for an injection molding system that obviates or mitigates at least one of the above-noted concerns is desirable.

SUMMARY

According to an example embodiment, there is provided an injection molding apparatus that includes a nozzle having a nozzle channel, a mold cavity in communication with the nozzle channel of the nozzle for receiving a melt stream of moldable material from the nozzle channel through a mold gate; and a valve pin that is axially movable through the nozzle channel of the nozzle between a first retracted position in which the valve pin closes the mold gate to block melt flow between the nozzle channel and the mold cavity, an extended position in which an end portion of the valve pin extends through the mold gate and into the mold cavity, and a second retracted position in which the end portion of the nozzle pin is withdrawn from the mold cavity into the nozzle and spaced apart from the mold gate thereby opening the mold gate. The end portion of the valve pin defines a melt flow path on an outer surface thereof that extends through the mold gate when the valve pin is in the extended position for transmitting the melt stream from the nozzle channel to the mold cavity when the valve pin is in the extended position.

According to another example embodiment there is provided a method of injecting a melt stream of moldable material into a mold cavity of an injection molding apparatus having a nozzle with a nozzle channel in communication with the mold cavity through a mold gate, and a valve pin mounted for axial movement through the nozzle channel relative to the mold gate between at least a first position in which the valve pin closes the mold gate, a second position in which the valve pin directs a melt stream through the mold gate and into the mold cavity in a first direction, and a third position in which the melt stream is directed through the mold gate in a second direction. The method includes delivering a melt stream of moldable material into the nozzle channel of the nozzle; moving the valve pin to the second position and directing the melt stream through the mold gate and into the mold cavity in the first direction; moving the valve pin to the third position and directing the melt stream through the mold gate and into the mold cavity in the second direction; and moving the valve pin the first position to close the mold gate.

According to another example embodiment there is provided an injection molding apparatus that includes a manifold and a nozzle, the manifold having a manifold channel for receiving a melt stream of moldable material under pressure and delivering the melt stream to a nozzle channel of the nozzle. A mold cavity is in communication with the nozzle channel of the nozzle for receiving melt through a mold gate. A valve pin is axially movable through the nozzle channel of the nozzle between a first retracted position, in which a forward end of the valve pin is seated in the mold gate to block melt flow between the nozzle channel and the mold cavity, an extended position, in which a portion of the valve pin is received in the mold cavity, and a second retracted position in which the forward end of the valve pin is retracted within the nozzle channel and spaced apart from the mold gate to allow melt flow between the nozzle channel and the mold cavity. A material feeding portion is provided in a guiding surface of the valve pin, such that in the extended position the material feeding portion is aligned with the mold gate to allow melt to flow between the nozzle channel and the mold cavity.

BRIEF DESCRIPTION OF THE FIGURES

Example embodiments of the present invention will now be described more fully with reference to the accompanying drawings in which like reference numerals indicate similar structure.

DESCRIPTION OF EXAMPLE EMBODIMENTS OF THE INVENTION

Figure 1:
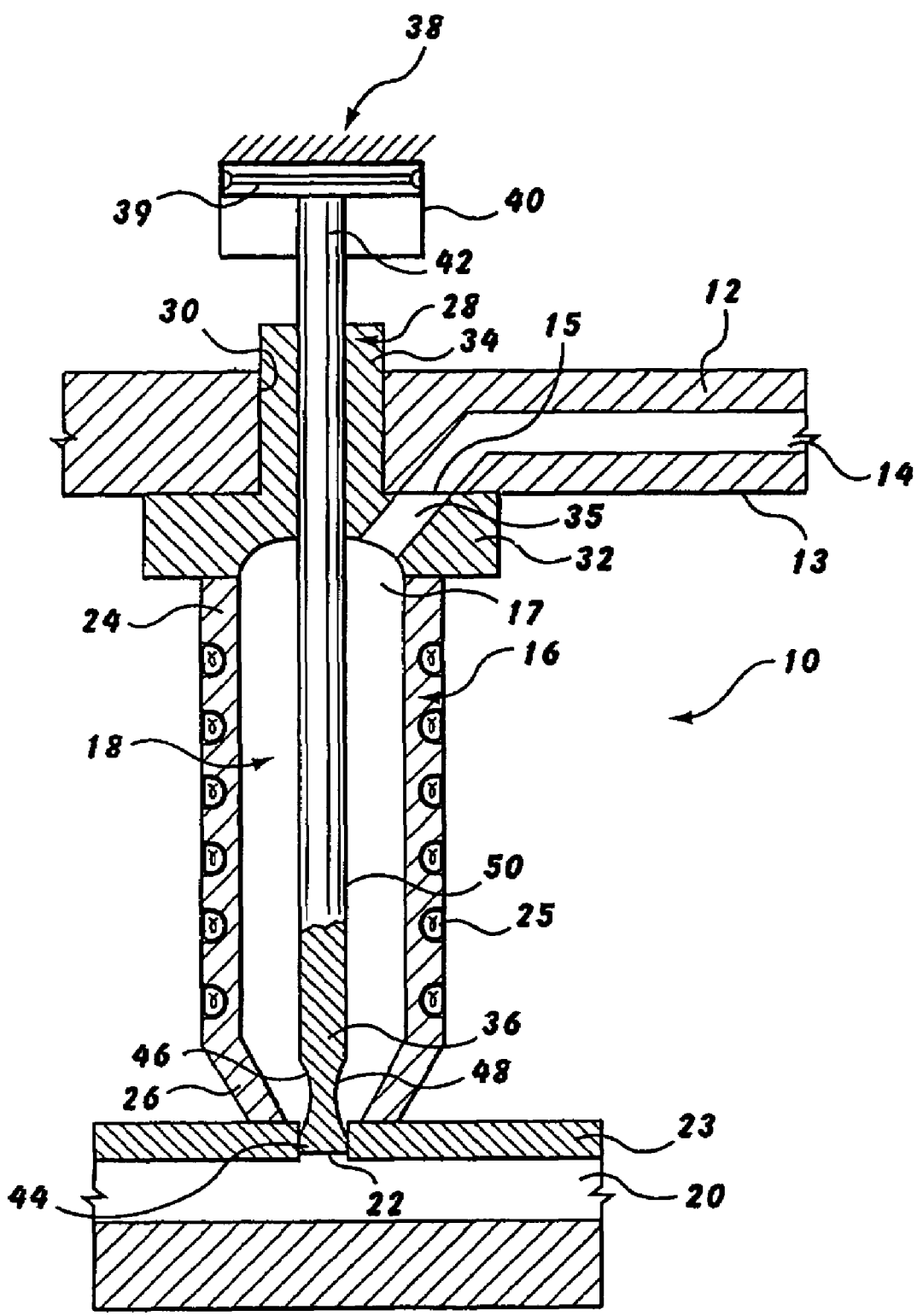
FIG. 1 is a side view partly in section of an injection molding apparatus according to an embodiment of the present invention.

Referring now to FIG. 1, a portion of an injection molding apparatus 10 is generally shown. The injection molding apparatus 10 includes a manifold 12 having a manifold channel 14 for receiving a melt stream of moldable material from a machine nozzle (not shown). A plurality of hot runner nozzles 16 having nozzle channels 18 are coupled to the manifold 12 (only one nozzle 16 is shown for simplicity). The nozzle 16 receives the melt stream from the manifold channel 14 and delivers the melt to a mold cavity 20 through a mold gate 22. The mold gate 22 extends through mold plate 23, which partially surrounds the mold cavity 20.

The nozzle 16 includes a first end 24 and a nozzle tip 26. A valve pin bushing 28 is provided between the nozzle 16 and the manifold 12. The valve pin bushing 28 includes a head portion 32, which is sandwiched between the first end 24 of the nozzle 16 and a lower surface 13 of the manifold 12, and a bushing portion 34, which is received in an aperture 30 provided in the manifold 12. The valve pin bushing 28 includes a channel 35 that is aligned with an outlet 15 of the manifold channel 14 and an inlet 17 of the nozzle channel 18.

The nozzle 16 further includes a heater 25. The heater 25 is a heating element embedded in an outer surface of the nozzle, however, it will be appreciated that the nozzle 16 may be heated in any suitable manner known in the art. The manifold 12 is also heated by a heater (not shown). The manifold heater may also be any suitable heater known in the art.

Figure 2:
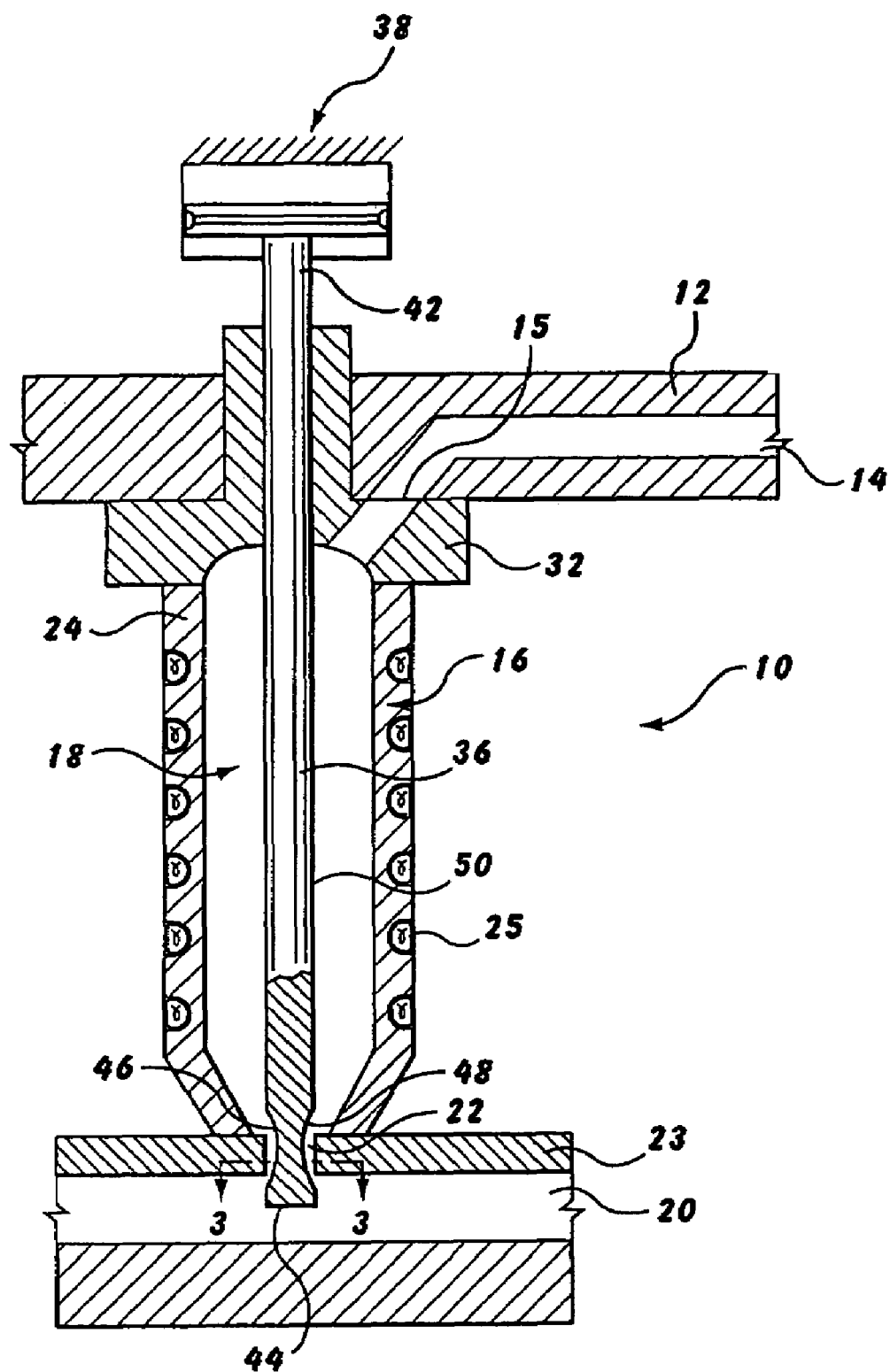
FIG. 2 is a side view partly in section of the injection molding apparatus of FIG. 1 in which a valve pin is in an extended position.

A valve pin 36 extends through the nozzle channel 18 of the nozzle 16 and is slidably received by the valve pin bushing 28. The valve pin 36 is axially movable between a retracted position, which is shown in FIG. 1, and an extended position, which is shown in FIG. 2. In the retracted position, the valve pin 36 is seated in the mold gate 22 to block melt flow between the nozzle channel 18 and the mold cavity 20. In the extended position, the valve pin 36 is located partly in the mold cavity 20 and the nozzle channel 18 is in fluid communication with the mold cavity 20 to allow melt to flow therebetween.

The valve pin 36 is actuated by an actuating device 38. The actuating device 38 includes a piston 39 that is movable within a cylinder 40. In an example embodiment, because the valve pin 36 closes the mold gate 22 by retracting, no packing is performed on the melt in the mold cavity 20. As such, in some applications, the piston 39 may be smaller than a piston used in injection molding apparatus that packs melt because the additional power for extending the valve pin into a full mold cavity is not required. As such, nozzles 16 including valve pins 36 are suitable for use in applications in which a small pitch between nozzles is important.

The actuating device 38 may be pneumatically or hydraulically driven. Alternatively, the valve pin 36 may be actuated by any other suitable means known in the art.

The valve pin 36 includes a first end 42, which is coupled to the piston 39, and a second end 44, which engages the mold gate 22. First and second grooves 46 and 48, respectively, are formed in an outer surface, or guiding surface, 50 of the valve pin 36. The grooves 46, 48 extend along a portion of the valve pin 36 adjacent the second end 44. The grooves 46, 48 form part of the nozzle channel 18 when the valve pin 36 is in the extended position of FIG. 1. Each groove 46, 48 has a generally smooth profile to facilitate the flow of melt into the mold cavity 20. The profile of the grooves 46, 48 is generally identical.

It will be appreciated that the profile of one or both of the grooves 46, 48 may be shaped differently in order to optimize the flow of melt for a particular injection molding application. In addition, the length of the grooves 46, 48 may be varied provided that the second end of the valve pin 36 engages the mold gate 22 to block melt flow between the nozzle channel 18 and the mold cavity 20.

Figure 3:
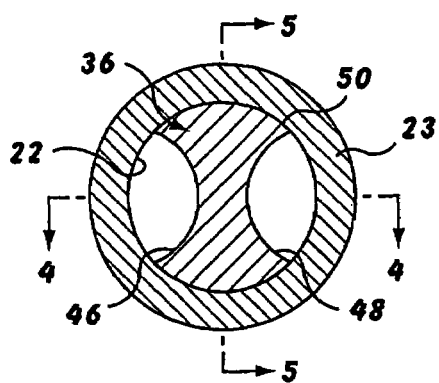
FIG. 3 is a view on 3-3 of FIG. 2.
Figure 4:
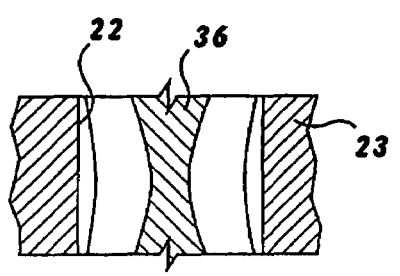
FIG. 4 is a view on 4-4 of FIG. 3.
Figure 5:
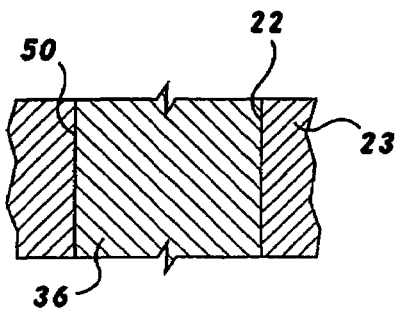
FIG. 5 is a view on 5-5 of FIG. 3.

Referring to FIGS. 3 to 5, a cross-sectional view of the valve pin 36 at the location of the grooves 46, 48 is shown. The grooves 46, 48 are generally crescent shaped to optimize the melt flow past the valve pin 36 without significantly compromising the strength of the valve pin 36.

At least a portion of the outer surface 50 of the valve pin 36 is continuously engaged in the mold gate 22. The continuous engagement of the valve pin 36 with the mold gate 22 functions to align the valve pin 36 within the mold gate 22. This is particularly useful in cases where the injection pressure is high and the transfer nozzle elements are very long. Further, wear of the mold gate 22 and the valve pin 36 is reduced.

Operation of the injection molding apparatus will now be described with reference to FIGS. 1 and 2. As shown in FIG. 1, the injection molding apparatus 10 begins the injection cycle with the valve pin 36 in the retracted position. In this position, melt flow from the nozzle channel 18 into the mold cavity 20 is blocked. The piston 39 is then actuated within cylinder 40 to move the valve pin 36 to the extended position of FIG. 2. Melt is delivered from the machine nozzle and flows through the manifold channel 14 and the nozzle channel 18. From the nozzle channel 18, the melt flows into the mold cavity 20 by passing through a material feeding portion defined by the grooves 46, 48 that are provided on opposite sides of the valve pin 36. As the valve pin 36 moves into the extended position, a portion of the outer surface 50 of the valve pin 36 continuously abuts the mold gate 22 to align the valve pin 36.

Once the mold cavity 20 has been filled with melt, the flow from the machine nozzle is halted and piston 39 is actuated within cylinder 40 to return the valve pin 36 to the retracted position. The melt in the mold cavity 20 is held at a sufficient pressure to allow the melt to decompress to fill the void that is left when the valve pin 36 is moved out of the mold cavity 20. The mold cavity 20 is then cooled and the molded parts are ejected from the mold cavity 20.

Operation of the valve pin is controlled by at least one sensor (not shown). The sensor may be located in the mold cavity 20, the nozzle 16, or the manifold 12.

Figure 6:
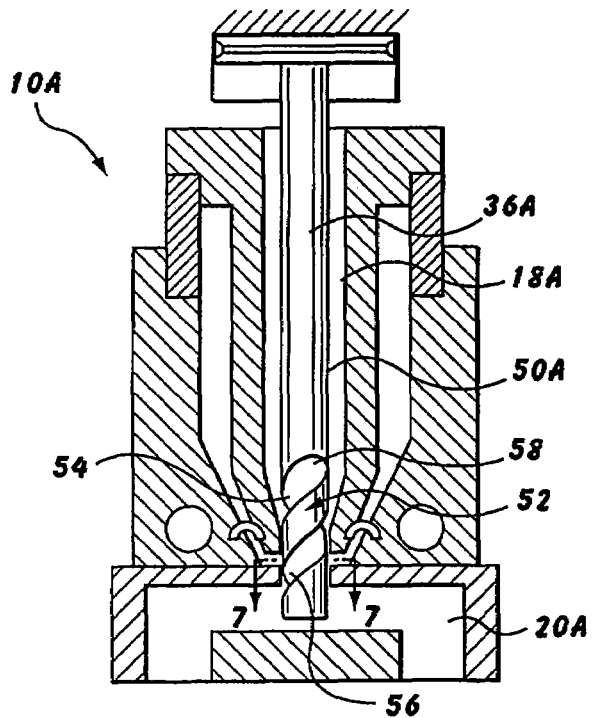
FIG. 6 is a side view partly in section of an injection molding apparatus according to another embodiment of the present invention.
Figure 7:
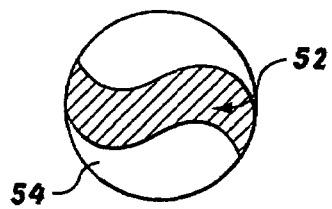
FIG. 7 is a view on 7-7 of FIG. 6.

Referring to FIGS. 6 and 7, another embodiment of an injection molding apparatus 10a is shown. In this embodiment, the grooves 46 and 48 of valve pin 36 of FIGS. 1 to 5 have been replaced with a single spiral or a helical groove 52 for guiding the melt from the nozzle into the mold cavity 20a during injection. The helical groove 52 is formed in an outer surface 50a of valve pin 36a. The helical groove 52 includes an inlet 58 and an outlet 56 and forms part of nozzle channel 18a when the valve pin 36a is in the extended position, as shown. The helical groove 52 is shaped to force the melt to follow a generally helical path between the nozzle channel 18a and mold cavity 20a. More than one helical groove may be provided to form more than one melt stream.

In another embodiment, the helical groove is a melt homogenizing element. In this embodiment, the melt homogenizing element causes the melt stream to rotate and thus, overlap and be redistributed as it moves through the helical groove so that the temperature and viscosity of the melt entering the mold cavity will be generally uniform, producing a high quality molded part that is generally free of flow lines.

Figure 8:
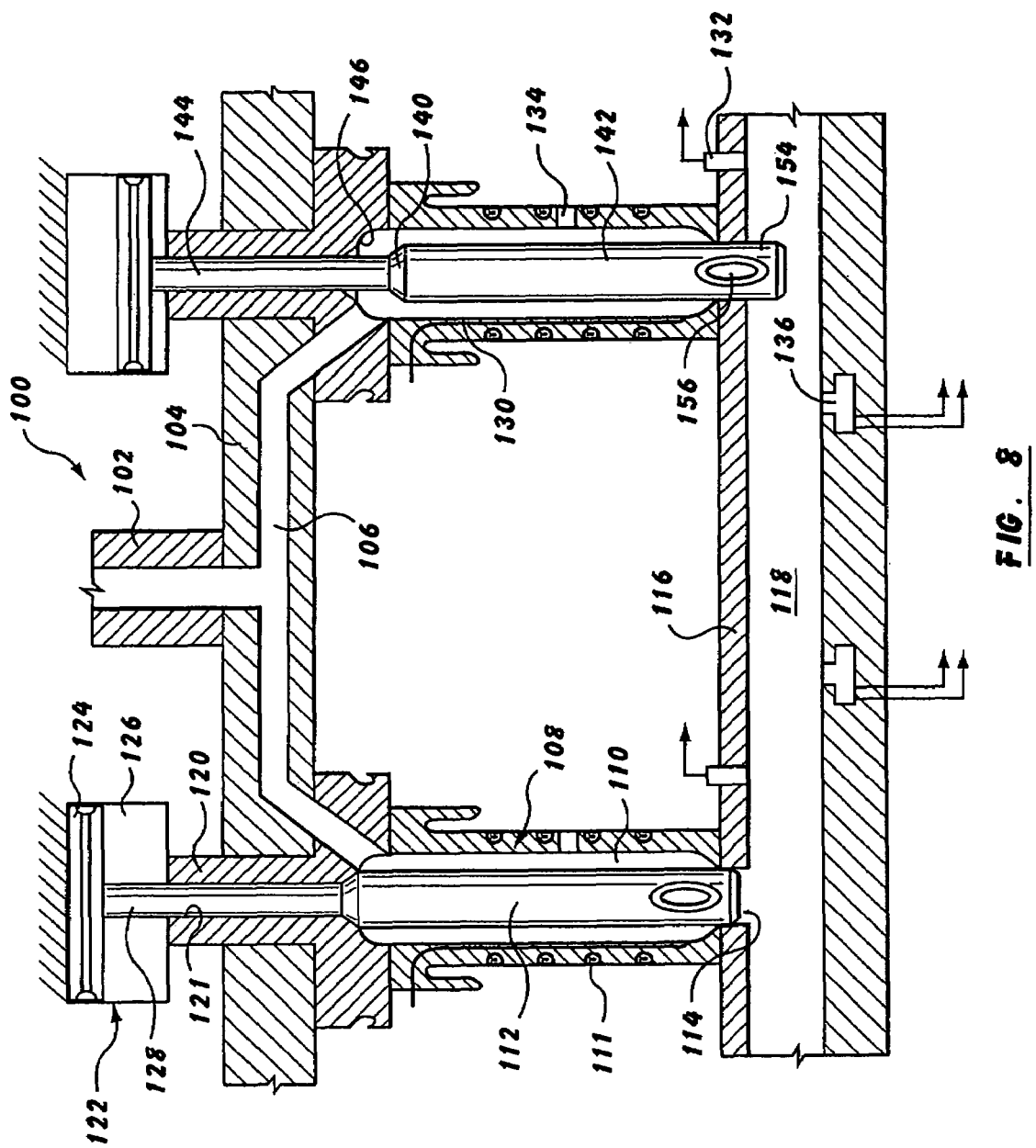
FIG. 8 is a side sectional view of an injection molding apparatus according to another embodiment of the present invention.

Referring to FIG. 8, another embodiment of an injection molding apparatus 100 is shown. The injection molding apparatus 100 is used in sequential molding in which more than one nozzle is used to inject melt into a single mold cavity. In this type of molding, the flow of melt from the nozzles is controlled in order to specify the location at which the different melt streams meet in the mold cavity.

The injection molding apparatus 100 includes a manifold 104 having a manifold channel 106 for receiving a melt stream of moldable material from a machine nozzle (not shown) through a sprue bushing 102. Nozzles 108 having nozzle channels 110 are coupled to the manifold 104. The nozzle channels 110 receive melt from the manifold channel 106. Valve pins 112 extend through the nozzles 108 and communicate with mold gates 114, which are provided in mold cavity plate 116. The valve pins 112 control the flow of melt from the nozzle channels 110 into a mold cavity 118. Heaters 111 heat the nozzles 108 and heaters (not shown) heat the manifold 104.

The valve pin 112 extends through a valve pin bushing 120 that is located between the nozzle and an actuating mechanism 122. The actuating mechanism 122 is generally a piston 124 that is slidable within a cylinder 126. A rear end 128 of the valve pin 112 is coupled to the piston 124 and the valve pin 112 is reciprocatable through the nozzle channel 110 to open and close the mold gate 114. The actuating mechanism 122 is pneumatically controlled. Alternatively, the actuating mechanism 122 may be controlled hydraulically or by other suitable means.

Similar to the previous embodiments, the valve pin 112 is seated in the mold gate 114 when it is in a retracted position, as shown by the nozzle on the left of FIG. 8, and allows melt to flow into the mold cavity 118 when it is in an extended position, as shown by the nozzle on the right of FIG. 8.

Figure 9:
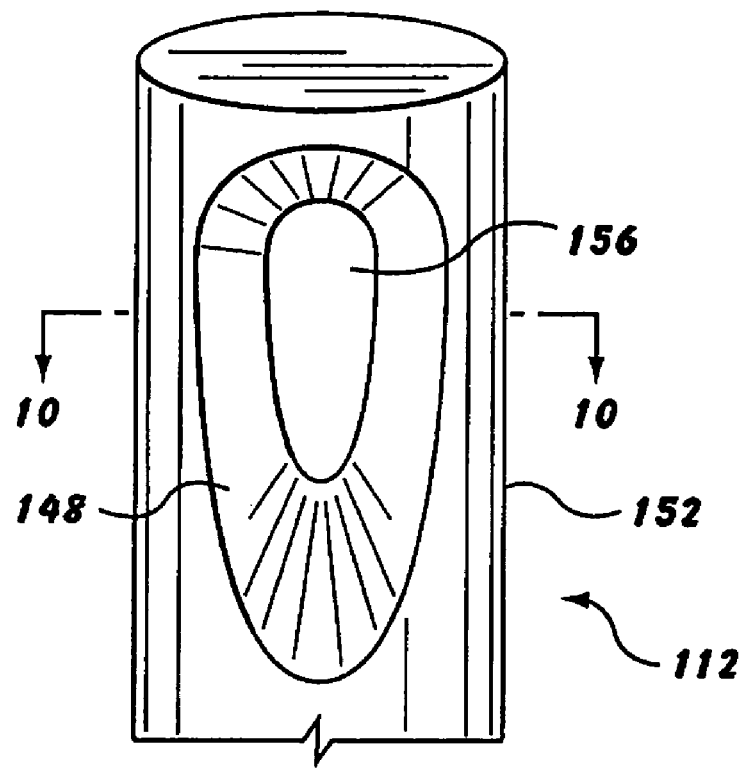
FIG. 9 is a view of a portion of a valve pin of FIG. 8.
Figure 10:
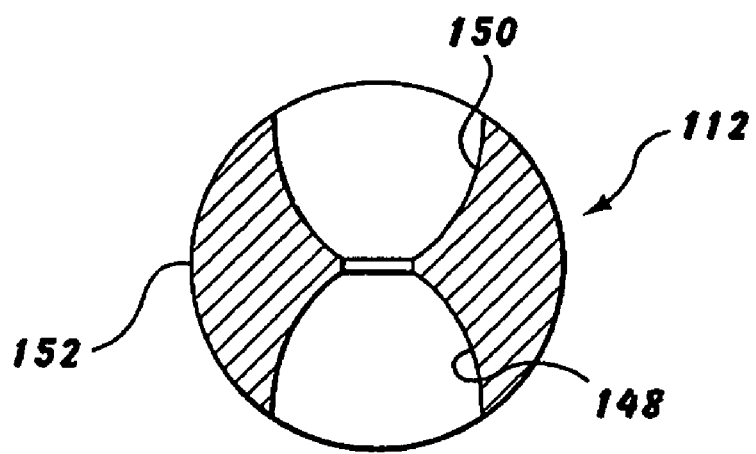
FIG. 10 is a view on 10-10 of FIG. 9.

Referring to FIGS. 9 and 10, the valve pin 112 includes a pair of opposing grooves, or notches, 148 and 150 that are formed in an outer surface 152 thereof. The grooves 148, 150 extend along a portion of a forward end 154 of the valve pin 112 on opposite sides thereof. The grooves 148, 150 intersect one another to provide an aperture 156 that extends through the valve pin 112. When the valve pin 112 is in the extended position, the forward end 154 of the valve pin 112 is partially located in the mold cavity 118 and the aperture 156 is aligned with the mold gate 114 to allow melt to flow from the nozzle channel 110 into the mold cavity 118. Each of the grooves 148, 150 has a generally smooth profile that is shaped to optimize the melt flow through the aperture 156.

At least a portion of the outer surface 152 of the valve pin 112 is continuously engaged in the mold gate 114 to align the valve pin 112 therewith, thus reducing wear of both the mold gate 114 and the valve pin 112.

The valve pin 112 further includes a tapered portion, or shoulder, 140 that provides a transition between a larger diameter portion 142 and a smaller diameter portion 144. A seat 146, which is shaped to receive the tapered portion 140 of the valve pin 112, is provided in the valve pin bushing 120. In the retracted position, the tapered portion 140 of the valve pin 112 mates with seat 146 to provide a seal between the nozzle channel 110 and the valve pin bushing 140. The tapered portion 140 generally prevents melt from escaping into valve pin receiving bore 121, which reduces the likelihood of damage to the valve pin 112 or seizure of the valve pin 112 within the valve pin bushing 120. The injection molding apparatus 100 further includes a thermocouple 130 for detecting the temperature of the melt in the nozzle 108 and a thermocouple 132 for detecting the temperature of the melt in the mold cavity 118.

In addition, pressure sensors 134 and 136 are provided in the nozzle 108 and mold cavity 118, respectively. The pressure sensors 134, 136 detect the pressure of the melt in the nozzle 108 and in the mold cavity 118.

In operation, melt flows from the machine nozzle, through the sprue bushing 102, through the manifold channel 106 and into the nozzle channels 110 of the nozzles 108. The melt flow from each nozzle 108 is controlled using the valve pins 112 in order to specify the location at which the melt streams meet in the mold cavity 118. Once the mold cavity 118 has been filled with melt, the flow from the machine nozzle is halted and the valve pins 112 of the open nozzles 108 are returned to the retracted position. The melt in the mold cavity 118 is held at a sufficient pressure to allow the melt to decompress to fill the void that is left when the valve pins 112 of the open nozzles move out of the mold cavity 118. The mold cavity 118 is then cooled and the molded parts are ejected therefrom.

During the injection process, the valve pin 112 of one nozzle 108 may be held in the retracted position, while the valve pin 112 of another nozzle 108 is held in the extended position. This arrangement typically results in the melt in the closed nozzle 108 being at a very high pressure. Leaking of plastic from the nozzle channel 110 into the valve pin-receiving bore 121 of the valve pin bushing 120 as a result of the high pressure is substantially prevented by the tapered portion 140 of the valve pin 112, which mates with the seat 146 of the valve pin bushing 120 to provide a seal therebetween.

Figure 11:
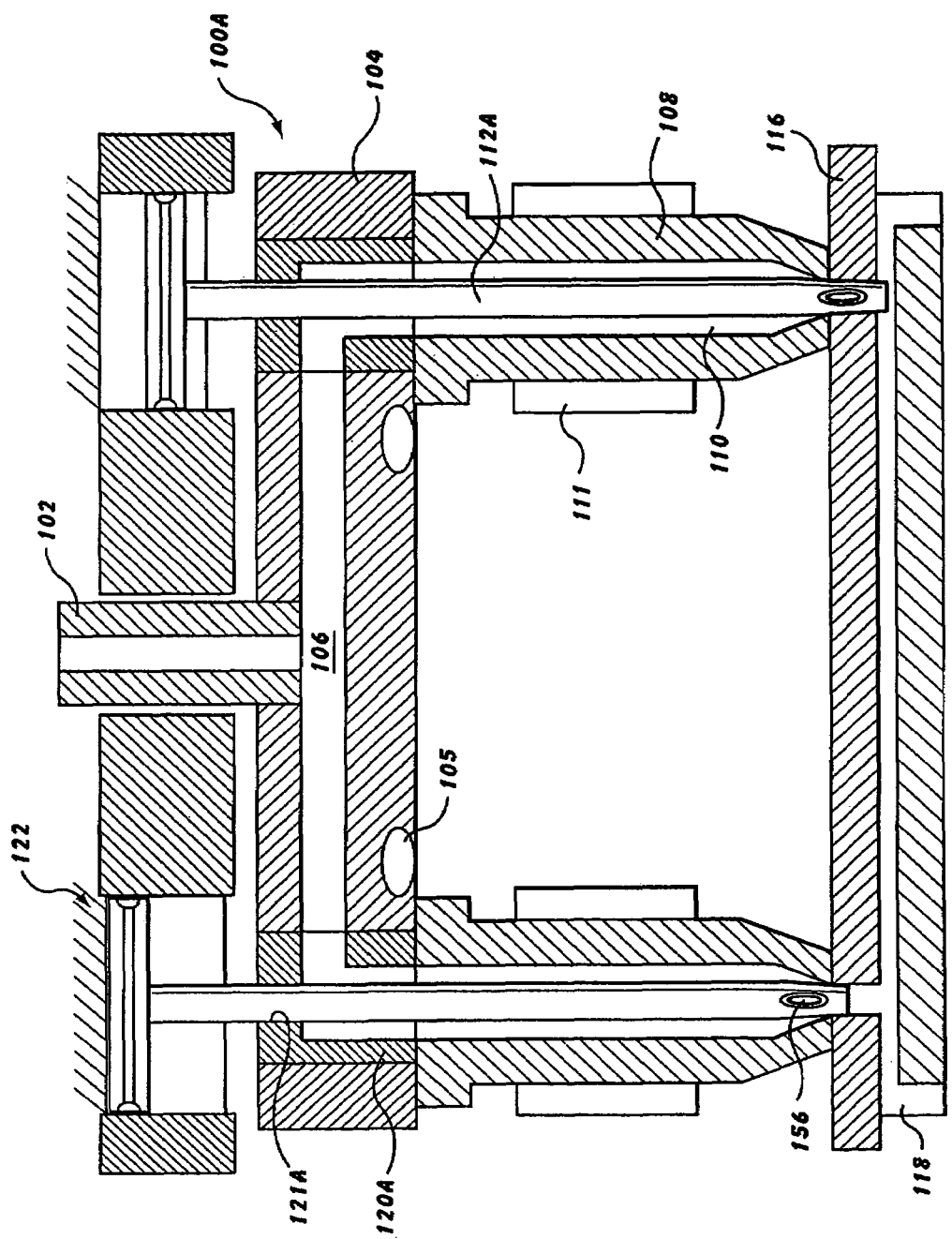
FIG. 11 is a side sectional view of an injection molding apparatus according to yet another embodiment of the present invention.

FIG. 11 shows another embodiment of an injection molding apparatus 100a. The injection molding apparatus 100a is similar to the injection molding apparatus 100 of FIG. 8, however, the tapered portion 140 has been removed so that the diameter of the valve pin 112a is constant. A manifold plug 120a is provided in the manifold 104 and includes a valve pin receiving bore 121a. Further, manifold heaters 105 are provided to heat the manifold 104.

Figure 12:
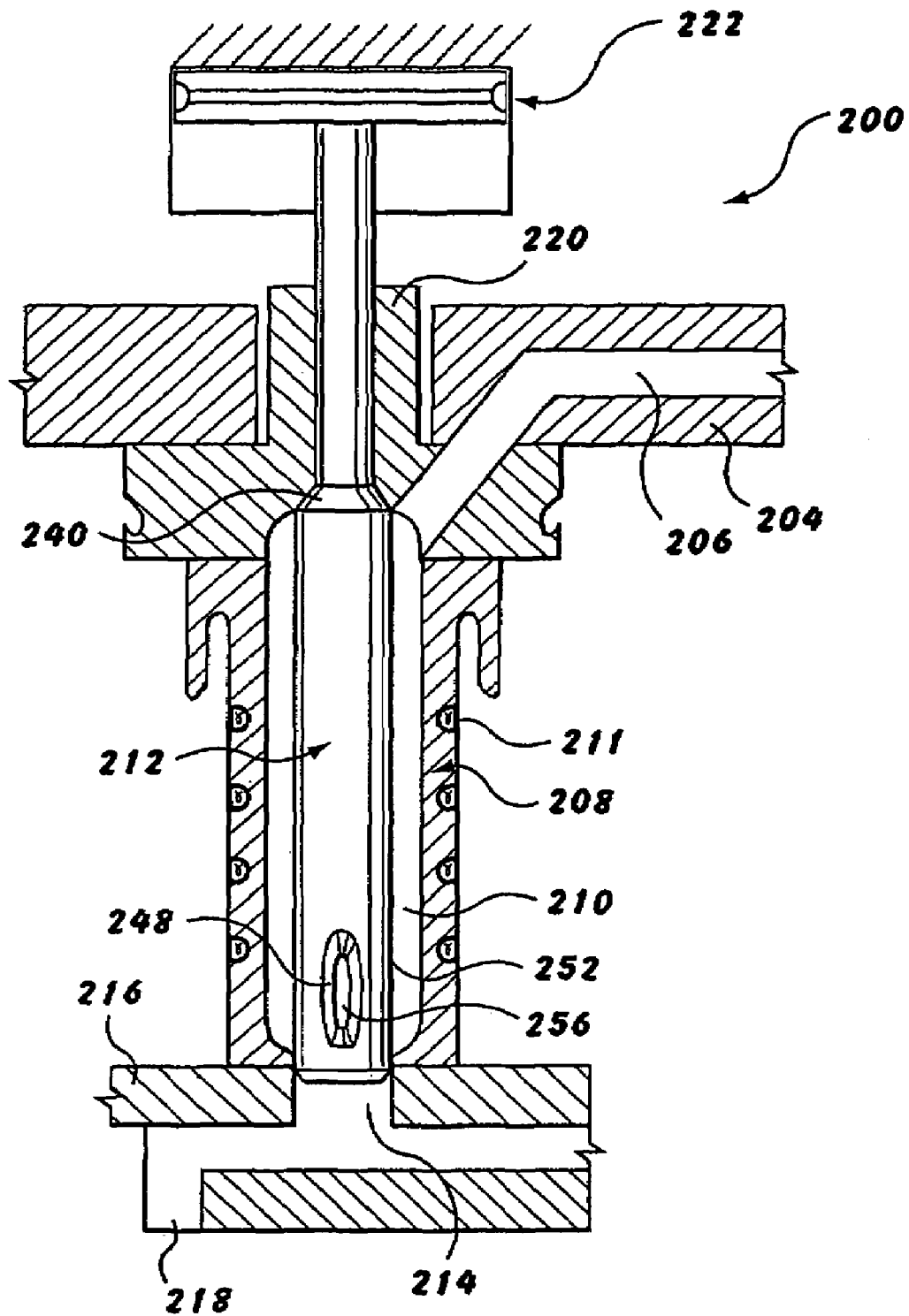
FIG. 12 is a side sectional view of an injection molding apparatus according to still another embodiment of the present invention.

Referring to FIG. 12, another embodiment of an injection molding apparatus 200, which is used in gas assist molding, is shown. Gas assist molding is used to form parts having inner hollow sections.

The injection molding apparatus 200 includes a manifold 204 having a manifold channel 206 for receiving melt from a machine nozzle (not shown) through a sprue bushing (not shown). A nozzle 208 having a nozzle channel 210 is coupled to the manifold 204. The nozzle channel 210 receives melt from the manifold channel 206. A valve pin 212 extends through the nozzle 208 and communicates with a mold gate 214 which is provided in mold cavity plate 216. The valve pin 212 is axially movable in the nozzle channel 210 by an actuating mechanism 222. The valve pin 212 controls the flow of melt from the nozzle channel 210 into a mold cavity 218. A heater 211 is provided to heat the nozzle 208 and a heater (not shown) heats the manifold 204.

The valve pin 212, which is slidable through a valve pin bushing 220, is similar to the valve pin 112 of the previously described embodiment of FIG. 8. The valve pin 212 moves from a retracted position in which the valve pin 212 is seated in the mold gate 214 to an extended position in which a portion of a forward end of the valve pin is located in the mold cavity 218. Grooves 248, 250 are provided in an outer surface 252 of the valve pin 212. (Groove 250 is located on the opposite of the valve pin 212 and is not visible in FIG. 12). The grooves 248, 250 intersect to provide an aperture 256 through the valve pin 212. In the extended position, the aperture 256 is aligned with the mold gate 214 to allow melt to flow from the nozzle channel 210 into the mold cavity 218.

In operation, melt flows from the machine nozzle, through the sprue bushing and manifold channel 206 into the nozzle channel 110. The valve pin 212 is moved from the retracted position to the extended position by the actuator 222. A predetermined quantity of melt, which is less than the volume of the mold cavity 218, is injected from the nozzle channel 210 into the mold cavity 218. Following injection of the melt, the valve pin 218 is returned to the retracted position to block the mold gate 214 and a gas is injected into the cavity 218. The gas creates a high pressure in the mold cavity 218 and forces the melt through the mold cavity 218 and against mold cavity walls while the melt cools. The high pressure in the mold cavity 218 further exerts a force on the valve pin 212.

In traditional valve pins, the high pressure in the mold cavity may cause the valve pin to retract into the nozzle channel and open the mold gate, which is undesirable. In the injection molding apparatus 200, the valve pin 212 is restricted from retracting into the nozzle channel 210 by the actuator 222.

Because the valve pin 212 must extend in order to open the valve gate 214, the valve gate 214 will not open as a result of the pressure in the mold cavity 218. Tapered portion 240 acts as a further stop for the valve pin 212.

Figure 13:
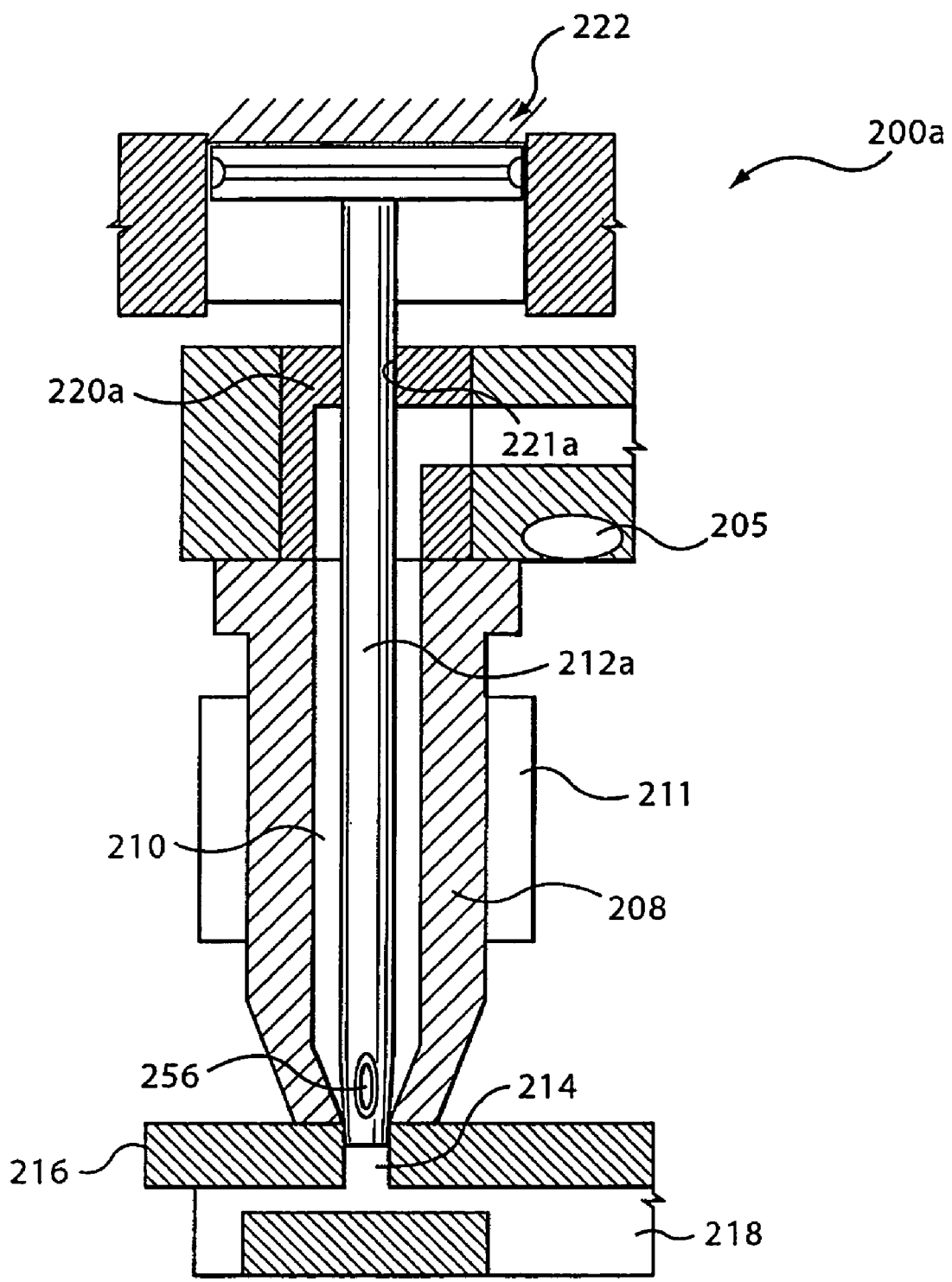
FIG. 13 is a side sectional view of an injection molding apparatus according to another embodiment of the present invention.

FIG. 13 shows another embodiment of an injection molding apparatus 200a. The injection molding apparatus 200a is similar to the injection molding apparatus 200 of FIG. 12, however, the tapered portion 240 has been removed so that the diameter of valve pin 212a is constant. A manifold plug 220a is provided in manifold 204 and includes a valve pin receiving bore 221a. Further, manifold heaters 205 are provided to heat the manifold 104.

Figure 14:
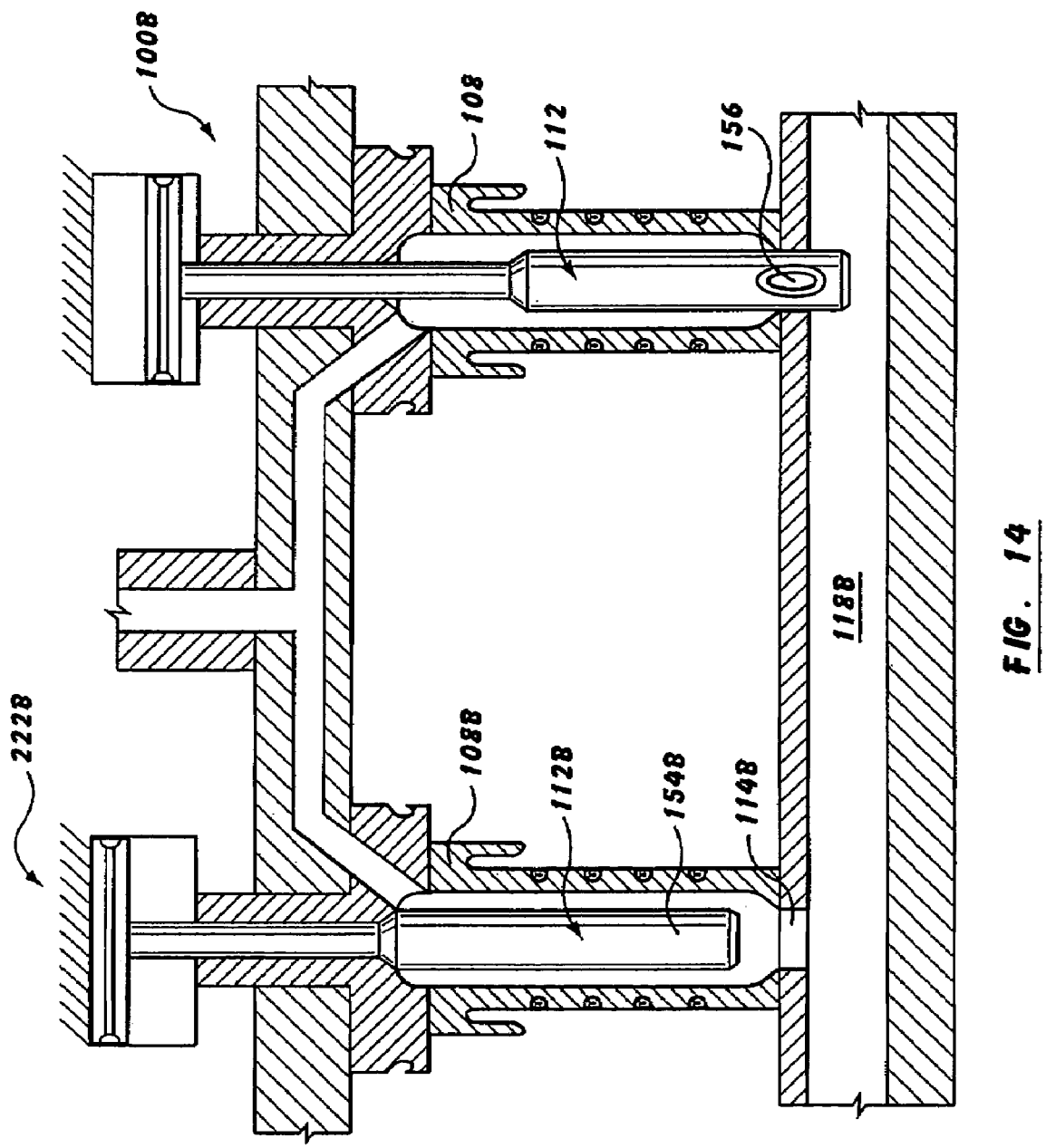
FIG. 14 is a side sectional view of an injection molding apparatus according to another embodiment of the present invention with the valve pins in an open position.
Figure 15:
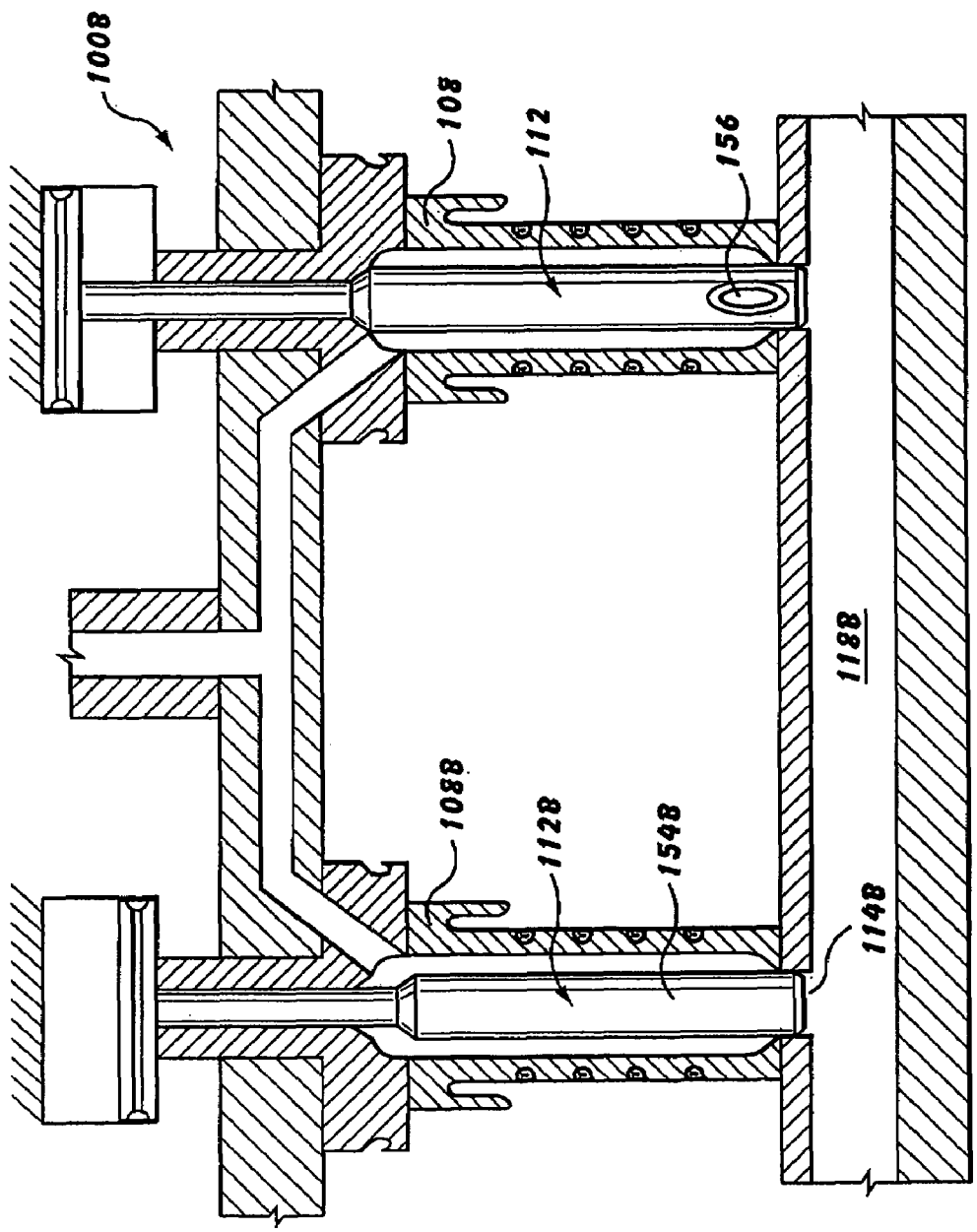
FIG. 15 is a side sectional view of the injection molding apparatus of FIG. 14 with the valve pins in a closed position.

Referring to FIGS. 14 and 15, another embodiment of an injection molding apparatus 100b is shown. The injection molding apparatus 100b is used in sequential molding and includes a nozzle 108b having a valve pin 112b, which is located on the left of the Figure, and a nozzle 108 having a valve pin 112, which is located on the right of FIG. 14 and is generally identical to the nozzle 108 of FIG. 8.

Valve pin 112b operates in an opposite manner to valve pin 112. The valve pin 112b is movable by an actuating mechanism 222b from a retracted position, in which mold gate 114b is open, and an extended position, in which the mold gate 114b is closed. Unlike the valve pin 112, a forward end 154b of the valve pin 112b does not extend into the mold cavity 118b during the injection process. Therefore, the aperture 156 is not included in the valve pin 112b because the valve pin 112b is not in continuous engagement with the mold gate 114b. FIG. 14 shows both valve pins 112b and 112 in an open position and FIG. 15 shows both valve pins 112b and 112 in the closed position.

By including different types of valve gating mechanisms, 112b and 112, in the injection molding apparatus 100b, the operator is able to pack the melt in the mold cavity 118b using the valve pin 112b, while the valve pin 112 will require no additional pressure to remain in a retracted, closed, position.

Figure 16:
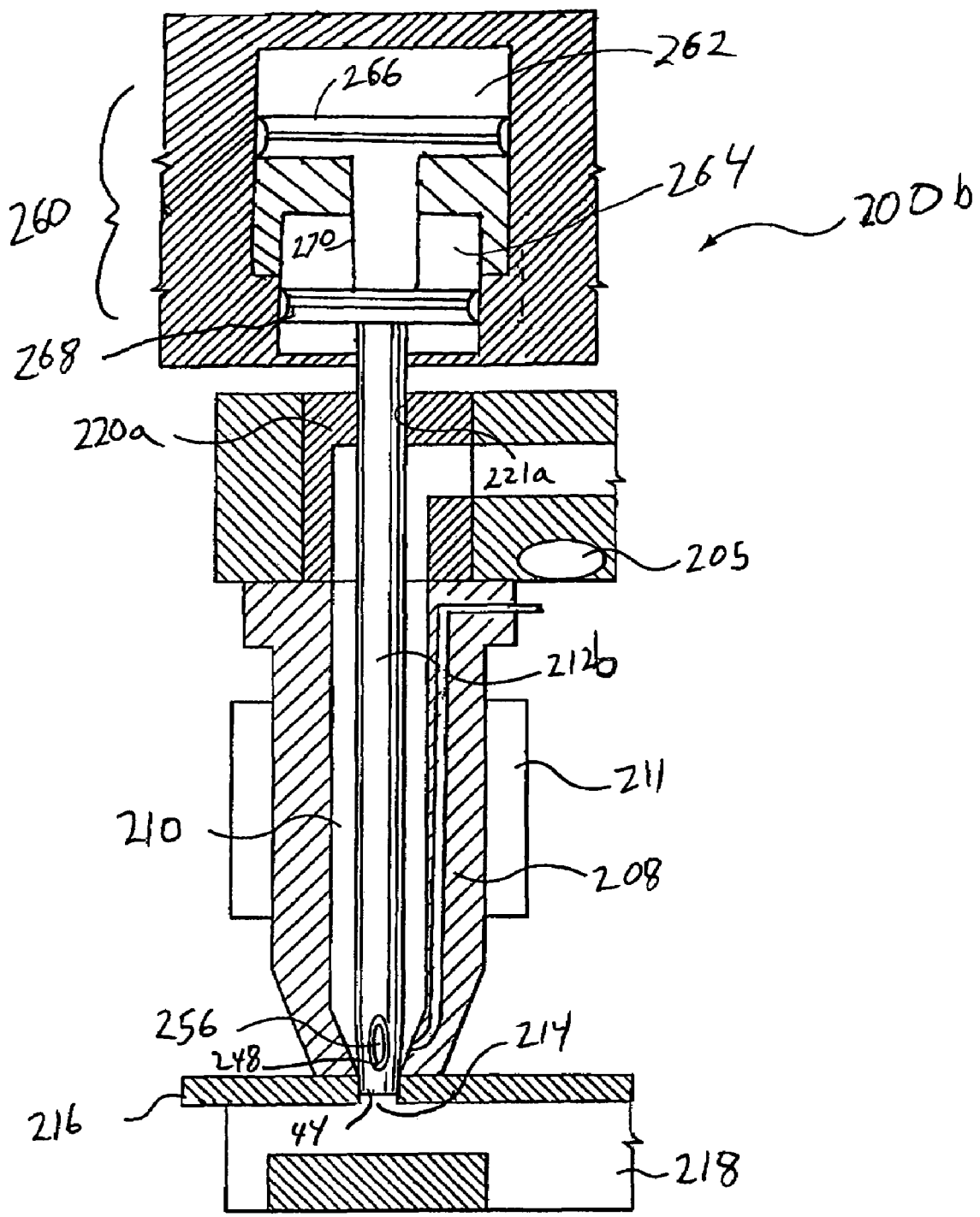
FIG. 16 is a side sectional view of an injection molding apparatus according to another example embodiment, with a valve pin in a first retracted position.
Figure 17:
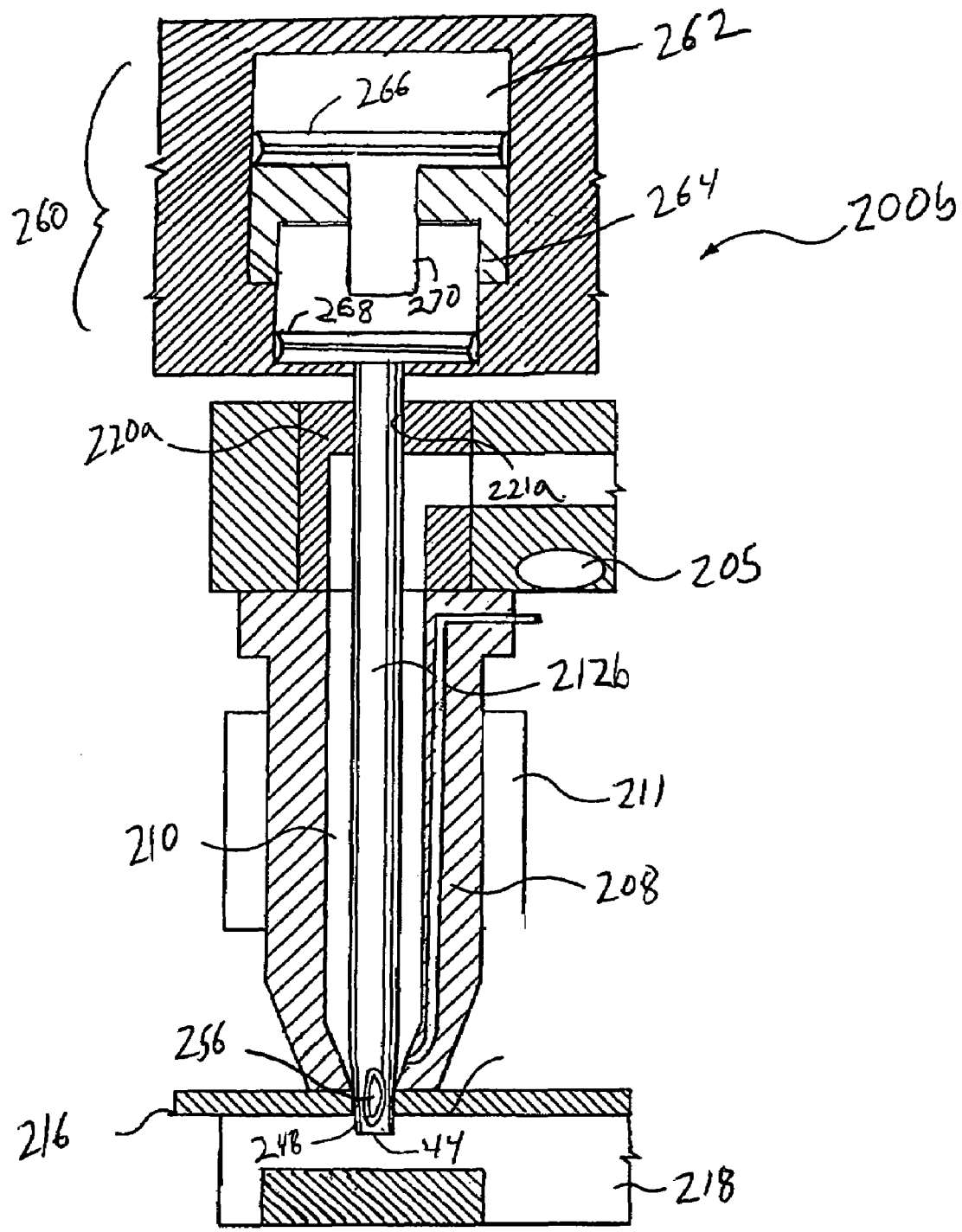
FIG. 17 shows the injection molding apparatus of FIG. 16 with the valve pin in an extended position.
Figure 18:
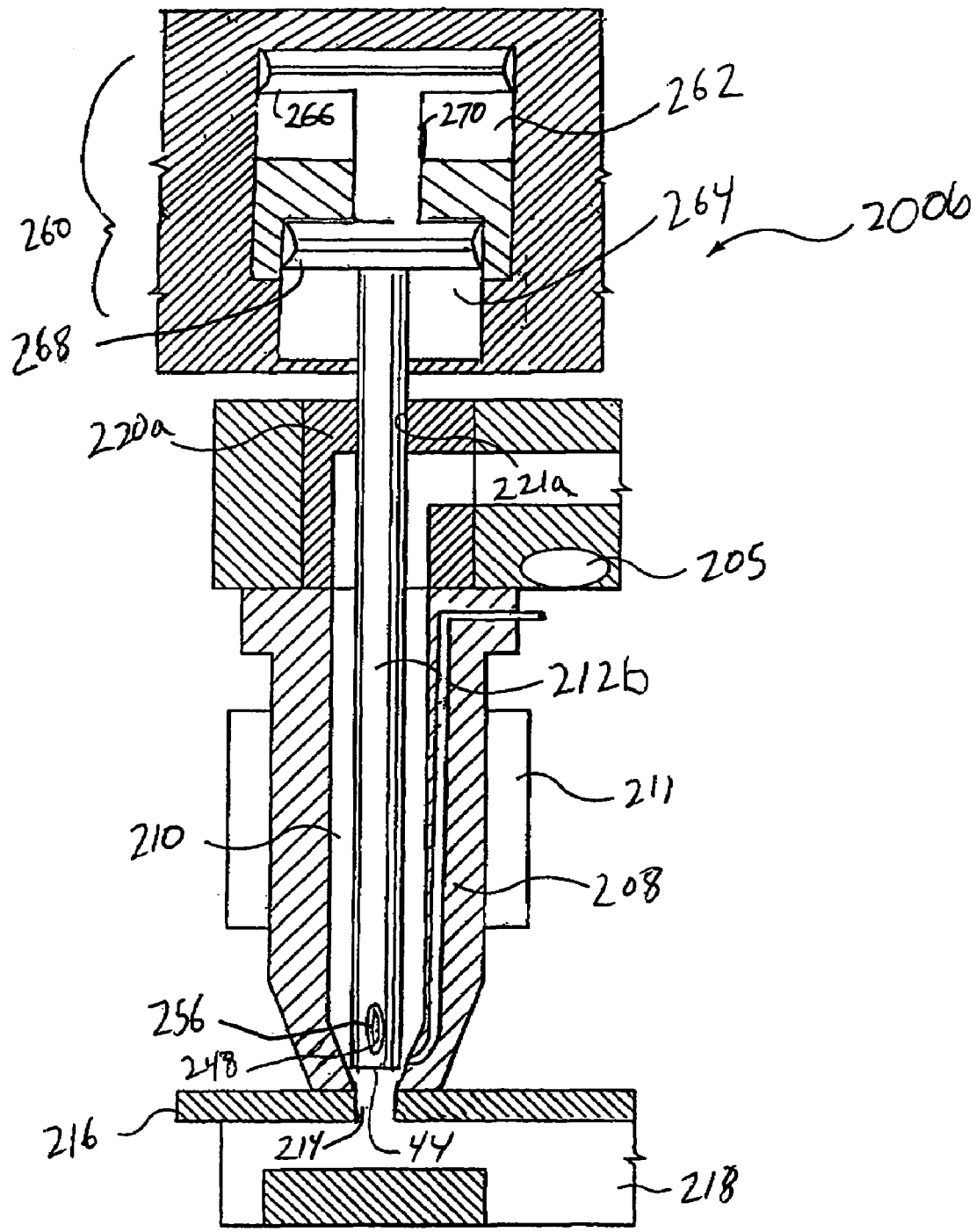
FIG. 18 shows the injection molding apparatus of FIG. 16 with the valve pin in a second retracted position.

FIGS. 16 through 18 show yet a further example embodiment of an injection molding apparatus 200b. The injection molding apparatus 200b is similar to the injection molding apparatus 200a of FIG. 13, however, the valve pin 212b of injection molding apparatus 200b is movable between a first retracted position for closing the melt flow to the mold cavity, shown in FIG. 16, an extended position for opening and diverting the melt flow into the cavity, as shown in FIG. 17, and a second retraced position for another open flow position to fill and pack the molded part, as shown in FIG. 18.

The valve pin 212b is actuated by a two-stage pneumatic or hydraulic actuator 260 that, in the illustrated embodiment, includes first and second piston chambers 262, 264. A first piston 266 is slidably located within the first piston chamber 262 and a second piston 268 at the first end of the valve pin 212b is slidably located within the second piston chamber 264. The first piston 266 includes an axially extending arm 270 that passes through a bore into the second piston chamber for acting on the second piston 268. The first and second piston chambers are ported through a valve arrangement to a source of fluid such that the pistons 266, 268 can be reciprocally driven to move the valve pin 212b between the three positions shown in FIGS. 16, 17 and 18. Although the actuator 260 described above is a two-stage pneumatically or hydraulically driven, any suitable actuator capable of moving the valve pin between the three different positions could be used.

Operation of the injection molding apparatus 200b of FIGS. 16-18 will now be described with reference to such Figures. Referring to FIG. 16, the injection molding apparatus 200b begins the injection cycle with the valve pin 212b in the first retracted position. In the first retracted position the first piston 266 is actuated to axially drive the valve pin 212b so that the second or forward end 44 of the valve pin 212b engages the mold gate 214 to block melt flow from the nozzle chamber 210 to the mold cavity 218. The second piston 268 is then actuated to move the valve pin 212b to the extended position shown in FIG. 17. In the extended position, the forward end 44 of the valve pin 212b extends partially into the mold cavity 218 such that a melt flow path from the nozzle channel 210 to the mold cavity 218 is provided by groove 248 and aperture 256. Thus, in the extended position, melt flows from the nozzle channel 210 to the mold cavity 218 by passing through a material feeding portion defined by groove 248 and an opposing groove (not shown in FIGS. 16-18) that intersect to form aperture 256. At least a portion of the valve pin forward end 44 is in continuous contact with and guided by the mold gate 214 as it moves from the first retracted position to the extended position. When the valve pin is in the extended position of FIG. 17, the needle eye-type configuration of the valve pin forward end 44 is such that the melt will typically be directed to enter the mold cavity 218 tangentially rather than impinge perpendicularly on the cavity wall opposite the gate 214, thus reducing the cold flow lines which would otherwise form the blush mark on the part opposite the gate.

In an example embodiment, the valve pin 212b is kept in the extended position until a predetermined fill threshold has been reached in the melt cavity 218. One or more sensors may be used in various embodiments to detect when the fill threshold has been reached. After this filling phase, the valve pin 212b is then retracted by actuating second piston 268 in a direction away from the gate 214 into the second retracted position as shown in FIG. 18. In the second retracted position, the forward end 44 of the valve pin 212b does not contact and is not guided by the mold gate 214. In the second retracted position packing can take place in a manner similar to a conventional valve gated nozzle. The valve pin 212b is then moved back to the first retracted position of FIG. 16 in order to complete the injection cycle. Movement of the valve pin to the first retracted position can in some applications push any melt remaining at the gate end of nozzle channel 210 into the mold cavity 218, further packing the fill in the mold cavity 218.

Thus, the melt stream is introduced to the mold cavity in a first direction when the valve pin is in the extended direction, and in a second direction when the valve pin is in the second retracted position. In some example embodiments, the first direction is substantially transverse to the axial axis of the nozzle, and the second direction is substantially parallel to the axial axis of the nozzle. In some applications, the method and apparatus described with reference to FIGS. 16-18 reduces the occurrence or severity of blush marks on the portion of the molded part that is located opposite the gate. The valve pin 212b is guided in the first retracted and extended positions, and as it moves between such positions, thereby providing alignment for the valve pin throughout much of the injection molding cycle.

In a further example embodiment, the injection cycle of apparatus 200b is modified to include an additional filling phase by moving the valve pin 212b from the first retracted position of FIG. 16 to the second retracted position of FIG. 18 for an initial filling phase, then to extended position of FIG. 17 for a further filling stage, then back to the second retracted position of FIG. 18 for a packing stage, and then finally back to the first retracted position of FIG. 16.

Although the valve pin 212b has been described as having needle-eye style aperture 256, any of the valve pin configurations described above, among other configurations, can be used in various embodiments. For example, instead of an aperture, the forward end 44 of the valve-pin nozzle could include non-intersecting opposed grooves 46, 48 of FIG. 1, or the helical groove 54 of FIG. 6, among other configurations that provide a melt path through the gate when the valve pin is in the extended position.

The apparatus 200b can be used in various injection molding applications. For example it could be used in sequential molding in which more than one nozzle is used to inject melt into a single mold cavity—using sensors, pressure can be measured in various portions of the mold cavity and based on the sensed pressure some nozzles can be kept filling or packing longer while others are closed sooner to achieve knit lines in desired locations on the molded part. Similarly, the apparatus 200b can be applied to family molds—based on sensed pressures, larger cavities can receive additional melt or packing at the same time that the nozzle feeding another smaller part is closing. The valve pin 212b can also be used in applications for general balancing between cavities, especially in large molds.

The many features and advantages of the invention are apparent from the detailed specification and, thus, it is intended by the appended claims to cover all such features and advantages of the invention that fall within the true spirit and scope of the invention. Further, since numerous modifications and changes will readily occur to those skilled in the art, it is not desired to limit the invention to the exact construction and operation illustrated and described, and accordingly all suitable modifications and equivalents may be resorted to, falling within the scope of the invention.

What is claimed is:

1. An injection molding apparatus comprising;
   a nozzle having a nozzle channel;
   a mold cavity in communication with the nozzle channel of the nozzle for receiving a melt stream of moldable material from the nozzle channel through a mold gate; and
   a valve pin axially movable through the nozzle channel of the nozzle between a first retracted position in which the valve pin closes the mold gate to block melt flow between the nozzle channel and the mold cavity, an extended position in which an end portion of the valve pin extends through the mold gate and into the mold cavity, and a second retracted position in which the end portion of the nozzle pin is withdrawn from the mold cavity into the nozzle and spaced apart from the mold gate thereby opening the mold gate,
   the end portion of the valve pin defining a melt flow path on an outer surface thereof that extends through the mold gate when the valve pin is in the extended position for transmitting the melt stream from the nozzle channel to the mold cavity when the valve pin is in the extended position.

2. The injection molding apparatus of claim 1 wherein the melt flow path on the outer surface of the valve pin is formed by a groove provided on the outer surface.

3. The injection molding apparatus of claim 2, further comprising a second groove provided in the outer surface of said valve pin, said second groove being located opposite the groove, the second groove extending through the mold gate when the valve pin is in the extended position for transmitting the melt stream from the nozzle channel to the mold cavity.

4. The injection molding apparatus of claim 3, wherein said groove and said second groove intersect to provide an aperture through said valve pin.

5. The injection molding apparatus of claim 1 wherein in said first retracted position and in said extended position and as the valve pin is moved therebetween, at least a portion of the outer surface of the valve pin is in continuous contact with the mold gate for aligning the valve pin with the mold gate.

6. The injection molding apparatus of claim 1 wherein the outer surface on which the melt flow path is defined has a smooth profile for facilitating the flow of the melt stream from the nozzle channel to the mold cavity.

7. The injection molding apparatus of claim 1 wherein the melt flow path is provided by a spiral groove formed on the outer surface of the valve pin.

8. An injection molding apparatus comprising:

a manifold and a nozzle, the manifold having a manifold channel for receiving a melt stream of moldable material under pressure and delivering the melt stream to a nozzle channel of the nozzle;

a mold cavity in communication with the nozzle channel of the nozzle for receiving melt through a mold gate;

a valve pin axially movable through the nozzle channel of the nozzle between a first retracted position, in which a forward end of the valve pin is seated in the mold gate to block melt flow between the nozzle channel and the mold cavity, an extended position, in which a portion of the valve pin is received in the mold cavity, and a second retracted position in which the forward end of the valve pin is retracted within the nozzle channel and spaced apart from the mold gate to allow melt flow between the nozzle channel and the mold cavity; and a material feeding portion provided in a guiding surface of the valve pin, wherein in the extended position, the material feeding portion is aligned with the mold gate to allow melt to flow between the nozzle channel and the mold cavity.

9. The injection molding apparatus as claimed in claim 8, wherein the material feeding portion has a smooth profile to facilitate the flow of melt from the nozzle channel to the mold cavity.

10. The injection molding apparatus as claimed in claim 8, wherein the material feeding portion includes a groove provided in the guiding surface of the valve pin.

11. The injection molding apparatus as claimed in claim 8, wherein said material feeding portion is a pair of opposing grooves provided in said guiding surface of said valve pin.

* * * * *